US012614749B2

(12) United States Patent
Chen et al.

(10) Patent No.:  US 12,614,749 B2
(45) Date of Patent:  Apr. 28, 2026

(54) DEVIATION DETECTION METHOD AND DEVIATION DETECTION DEVICE

(71) Applicant: CONTEMPORARY AMPEREX TECHNOLOGY (HONG KONG) LIMITED, Hong Kong (CN)

(72) Inventors: Jiwei Chen, Ningde (CN); Xuming Wang, Ningde (CN); Yuanyuan Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 218 days.

(21) Appl. No.: 18/484,455

(22) Filed: Oct. 11, 2023

(65) Prior Publication Data

US 2024/0039031 A1     Feb. 1, 2024

Related U.S. Application Data

(63) Continuation of application No. PCT/CN2021/121342, filed on Sep. 28, 2021.

(51) Int. Cl.
| | |
|---|---|
| H01M 10/04 | (2006.01) |
| G06T 7/00 | (2017.01) |
| H01M 10/48 | (2006.01) |

(52) U.S. Cl.
CPC ....... H01M 10/0409 (2013.01); G06T 7/0004 (2013.01); H01M 10/48 (2013.01); G06T 2207/30108 (2013.01)

(58) Field of Classification Search
CPC . H01M 10/0409; H01M 10/48; G06T 7/0004; G06T 2207/30108
See application file for complete search history.

(56) References Cited

FOREIGN PATENT DOCUMENTS

| | | |
|---|---|---|
| CN | 104197841 A | 12/2014 |
| CN | 105987919 A | 10/2016 |

(Continued)

OTHER PUBLICATIONS

EPO machine generated English translation of CN-111416142-A (Year: 2020).*
EPO machine generated English translation of JP-2018113198-A (Year: 2018).*
The Request for the Submission of an Opinion received in the counterpart KR application 10-2023-7025503, dated Apr. 15, 2025, 6 pages with English translation.
The extended European search report received in the corresponding European application 21958664.1, mailed on Mar. 1, 2024.

(Continued)

*Primary Examiner* — Kimberly Wyluda
(74) *Attorney, Agent, or Firm* — K&L Gates LLP

(57)     ABSTRACT

A deviation detection method and a deviation detection device for detecting positional deviation of an electrode assembly during winding are provided. The method comprises: obtaining a plurality of first images and a plurality of second images by using a photographing unit during the winding process of the electrode assembly, where the first image includes a first electrode sheet, and the second image includes a second electrode sheet; matching a first image with a second image, where the first image and the second image contain the same or corresponding identification objects, and the identification objects are portions periodically formed on each winding layer of the electrode assembly; and determining whether the electrode assembly is deviated according to the boundary of the first electrode sheet in the first image and/or the boundary of the second electrode sheet in the second image in a group of matching first and second images.

8 Claims, 5 Drawing Sheets

(56)  References Cited

FOREIGN PATENT DOCUMENTS

| CN | 108695559 | B   | 10/2018 |   |
|----|-----------|-----|---------|---|
| CN | 109301352 | A   | 2/2019  |   |
| CN | 109494342 | A   | 3/2019  |   |
| CN | 109636858 | A   | 4/2019  |   |
| CN | 110264439 | A   | 9/2019  |   |
| CN | 111416142 | A   | 7/2020  |   |
| CN | 213340470 | U   | 6/2021  |   |
| CN | 113270630 | A   | 8/2021  |   |
| JP | 2009170136 | A  | 7/2009  |   |
| JP | 2010177068 | A  | 8/2010  |   |
| JP | 5279533   | B2  | 9/2013  |   |
| JP | 2016012549 | A  | 1/2016  |   |
| JP | 2018113198 | A * | 7/2018 | ............. G01N 21/88 |
| JP | 2018170103 | A  | 11/2018 |   |
| KR | 20060085440 | A | 7/2006  |   |
| KR | 20150049979 | A | 5/2015  |   |
| KR | 20200089173 | A | 7/2020  |   |

OTHER PUBLICATIONS

The Notice of Reasons for Refusal received in the corresponding Japanese application 2023-545879, mailed on Oct. 10, 2024.

The international search report received in the corresponding international application PCT/CN2021/121342, mailed on Jun. 23, 2022.

The written opinion received in the corresponding international application PCT/CN2021/121342, mailed on Jun. 23, 2022.

The Intention to grant of the patent family application No. EP21958664.1 that issued on Feb. 20, 2025 from the EPO.

The Decision to Grant of the patent family application No. 2023-545879 that issued on Mar. 11, 2025 from the JPO.

The Grant Notice received in the counterpart CN Application No. 202180068327.0, dated Aug. 27, 2025, 10 pages with English translation.

The Written Decision on Registration received in the counterpart KR Application No. 10-2023-7025503, dated Sep. 29, 2025, 5 pages with English translation.

* cited by examiner

DEVIATION DETECTION METHOD AND DEVIATION DETECTION DEVICE

CROSS-REFERENCE TO RELATED APPLICATIONS

This application is a continuation of International Application PCT/CN2021/121342, filed Sep. 28, 2021 and entitled "DEVIATION DETECTION METHOD AND DEVIATION DETECTION DEVICE", which is incorporated herein by reference in its entirety.

TECHNICAL FIELD

The present application relates to the field of battery manufacturing, and in particular, to a deviation detection method and a deviation detection device, for detecting positional deviation of an electrode assembly when the electrode assembly is manufactured by winding.

BACKGROUND

The electrode assembly, as a component of a battery cell where electrochemical reaction occurs, is generally formed by winding or stacking of a first electrode sheet, a second electrode sheet, and a separator. During a winding process of an electrode assembly, the first electrode sheet, the second electrode sheet and the separator are prone to deflect, which makes the first electrode sheet, the second electrode sheet and the separator deviate from their normal position. The winding quality of an electrode assembly directly affects the performance of a battery cell. Therefore, how to detect deviation of an electrode assembly accurately is critical to battery manufacturing.

SUMMARY OF THE INVENTION

In view of the above problem, the present invention provides a deviation detection method and a deviation detection device, which can accurately detect positional deviation of an electrode assembly during winding.

In a first aspect, a deviation detection method is provided, wherein it is used to detect positional deviation of an electrode assembly during winding, the electrode assembly includes a first electrode sheet and a second electrode sheet, and the deviation detection method includes: an image obtaining step of obtaining a plurality of first images and a plurality of second images by using a photographing unit during the winding process of the electrode assembly, wherein the first image includes the first electrode sheet, and the second image includes the second electrode sheet; an image matching step of matching a first image with a second image, wherein the first image and the second image contain the same or corresponding identification objects, the identification objects are portions periodically formed on each winding layer of the electrode assembly; and a deviation determining step of determining whether the electrode assembly is deviated according to the boundary of the first electrode sheet in the first image and/or the boundary of the second electrode sheet in the second image in a group of matching first and second images.

In the technical solutions of the embodiments of the present application, due to the influences of the winding speed of the electrode assembly winding apparatus and the position of the photographing unit and the like, the first electrode sheet in the first image and the second electrode sheet in the second image that are obtained simultaneously may not have a corresponding relationship with each other. That is, in the images obtained simultaneously, the second electrode sheet in second image may enter the electrode assembly winding apparatus earlier than the first electrode sheet in the first image. According to the technical solutions of the embodiments of the present application, it is ensured that a first electrode sheet and a second electrode sheet in a group of matching first and second images correspond to each other, that is, the first electrode sheet and the second electrode sheet in a group of matching first and second images are from the same winding layer of the wound electrode assembly. Thus, it is possible to determine positional deviation of the electrode assembly during a winding process more accurately.

In some embodiments, in the deviation determining step, comparison regions are set according to the identification objects, and whether the electrode assembly is deviated is determined according to the boundary of the first electrode sheet in a comparison region of the first image and/or the boundary of the second electrode sheet in a comparison region of the second image. Through the image matching step, it can be ensured that the first image and the second image in a determining step are two images of the same winding layer. The comparison regions determined through the identification objects can further ensure that the regions where the deviation determination is performed are the same region of the first electrode sheet and the second electrode sheet that are stacked with each other in the same winding layer. Thus, it is possible to determine positional deviation of the electrode assembly during a winding process more accurately.

In some embodiments, the first image is an image before the electrode assembly is wound around a winding needle, and the second image is an image after the electrode assembly is wound around the winding needle. In the process of winding around the winding needle, the electrode sheet is prone to deviate. The state of the electrode sheet before and after wound can be obtained from the first image and the second image, respectively, so as to determine whether there is positional deviation of the electrode assembly during the winding process.

In some embodiments, in the image obtaining step, the first image and the second image are obtained when the winding needle rotates for a preset angle. By setting the preset angle, it can be ensured that each of the output first image and the second image contains only one identification object, thereby ensuring that the comparison regions can be determined by using the identification objects in the first image and the second image. Further, since the images are obtained during rotation, the deviation determination may be performed in real time.

In some embodiments, the photographing unit includes a first camera and a second camera, the first camera photographs the first image, the second camera photographs the second image, and the first camera and the second camera photograph two opposite faces of the electrode assembly, respectively. The electrode assembly 100 is prone to deviate during the process of winding around the winding needle. By comparing the first image T1 and the second image T2 of two opposite faces of the electrode assembly 100, it can be determined whether the first electrode sheet 1 and the second electrode sheet 2 are deviated during the process of winding around the winding needle.

In some embodiments, in the image matching step, the (n+1)th second image and the n-th first image that are obtained in the image obtaining step are matched. Due to the influences of the winding speed of the electrode assembly winding apparatus and the position of the photographing unit and the like, in the two images obtained simultaneously, the electrode assembly in the second image is wound around the winding needle earlier than the first electrode assembly in the first image, and there is no identification object in the first photo of the second image T2. By matching the (n+1)th second image with the n-th first image, it can be ensured that in a group of matched images, the electrode assembly in a second image and the electrode assembly in a first image are correspond to each other, that is, in a group of matching first and second images, the first electrode sheet and the second electrode sheet are from the same winding layer of the wound electrode assembly, so that positional deviation of the electrode assembly during a winding process can be determined more accurately.

In some embodiments, the identification objects are a tab of the first electrode sheet and/or a tab of the second electrode sheet in the same winding layer. Since the tab of the first electrode sheet and/or the tab of the second electrode sheet are periodically formed on portions of each winding layer of the electrode assembly, there is no need to additionally provide an identifier on the electrode assembly, and the comparison regions in the first image and the second image can be determined only through the tab of the first electrode sheet and/or the tab of the second electrode sheet.

In some embodiments, in the deviation determining step, in a group of matching first and second images, a first distance is obtained from the first image, a second distance is obtained from the second image, the first distance is a distance from a first reference point to the boundary of the first electrode sheet, and the second distance is a distance from a second reference point to the boundary of the second electrode sheet, and when the difference between the first distance and the second distance minus a preset distance between the boundary of the first electrode sheet and the boundary of the second electrode sheet is greater than a first threshold, it is determined that the electrode assembly is deviated. Thus, by comparing the first distance and the second distance, it is possible to determine the relative positional relationship between the first electrode sheet and the second electrode sheet, so as to determine whether the electrode assembly has a positional deviation during the winding process of the electrode assembly.

In some embodiments, in the deviation determining step, in a group of matching first and second images, a first distance is obtained from the first image, a second distance is obtained from the second image, the first distance is a distance from a first reference point to the boundary of the first electrode sheet, and the second distance is a distance from a second reference point to the boundary of the second electrode sheet, it is determined whether the first electrode sheet of the electrode assembly is deviated by comparing the first distance with a preset value of the first distance, and it is determined whether the second electrode sheet of the electrode assembly is deviated by comparing the second distance with a preset value of the second distance. Thus, by comparing the first distance and the second distance with preset values thereof respectively, it can be respectively determined whether the first electrode sheet and the second electrode sheet have a positional deviation, and compared with determining the relationship between the first distance and the second distance, which electrode sheet has a positional deviation can be determined more precisely.

In a second aspect, a deviation detection device is provided, wherein it is configured to detect positional deviation of an electrode assembly during a winding process, the electrode assembly includes a first electrode sheet and a second electrode sheet, and the deviation detection device includes: an image obtaining unit, configured to obtain a plurality of first images and a plurality of second images during the winding process of the electrode assembly, where the first image includes the first electrode sheet, and the second image includes the second electrode sheet; an image matching unit, configured to match a first image with a second image, where the first image and the second image contain the same or corresponding identification objects, and the identification objects are portions periodically formed on each winding layer of the electrode assembly; and a deviation determining unit, configured to determine, for a group of matching first and second images, whether the electrode assembly is deviated according to the boundary of the first electrode sheet in the first image and/or the boundary of the second electrode sheet in the second image.

DESCRIPTION OF DRAWINGS

The drawings described herein are intended to provide a further understanding of the present application, which constitute a part of the present application. The illustrative embodiments of the present application and the description thereof are for explaining the present application and do not constitute an undue limitation of the present application. In the drawings.

Figure 1:
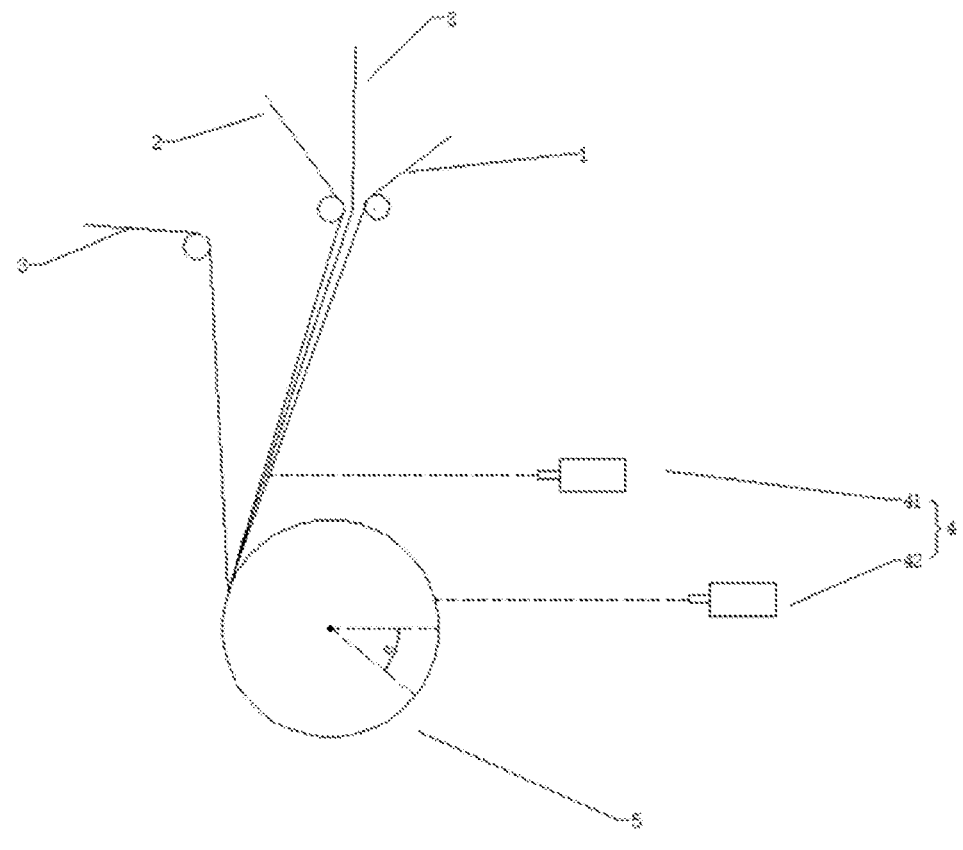
FIG. 1 is a schematic diagram of an apparatus for manufacturing an electrode assembly according to an embodiment of the present application.

DESCRIPTION OF REFERENCE NUMERALS 100 electrode assembly
1 first electrode sheet
11 first tab
2 second electrode sheet
22 second tab
3 separator
4 photographing unit
41 first camera
42 second camera
5 winding needle
6 identification object
α preset angle
T1 first image
T2 second image
S comparison region
A1 first reference point
A2 second reference point
d1 first distance
d2 second distance
200 deviation detection method
210 image obtaining step

220image matching step

230deviation determining step

DETAILED DESCRIPTION

For the objects, technical solutions and advantages of the embodiments of the present application to be clearer, the technical solutions in the embodiments of the present application will be clearly described below in conjunction with the drawings in the embodiments of the present application, and it is apparent that the described embodiments are a part of the embodiments of the present application rather than all the embodiments. Based on the embodiments in the present application, all other embodiments obtained by those of ordinary skill in the art without creative effort fall within the protection scope of the present application.

Unless otherwise defined, all technical and scientific terms used herein have the same meaning as commonly understood by those skilled in the art belonging to the technical field of the present application; the terms used in the specification of the present application are intended only for the purpose of describing specific examples and are not intended to limit the present application; the terms "including" and "having" and any variations thereof in the specification and the claims of the present application and in the description of drawings above are intended to cover non-exclusive inclusion. The terms "first", "second", and the like in the specification and claims of the present application or the foregoing drawings are used to distinguish between different objects, but are not used to describe a specific sequence or a primary-secondary relationship.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the present application, "a plurality of" means two or more (including two), similarly, "a plurality of groups" means two or more groups (including two groups), and "a plurality of sheets" means two or more sheets (including two sheets).

Figure 2:
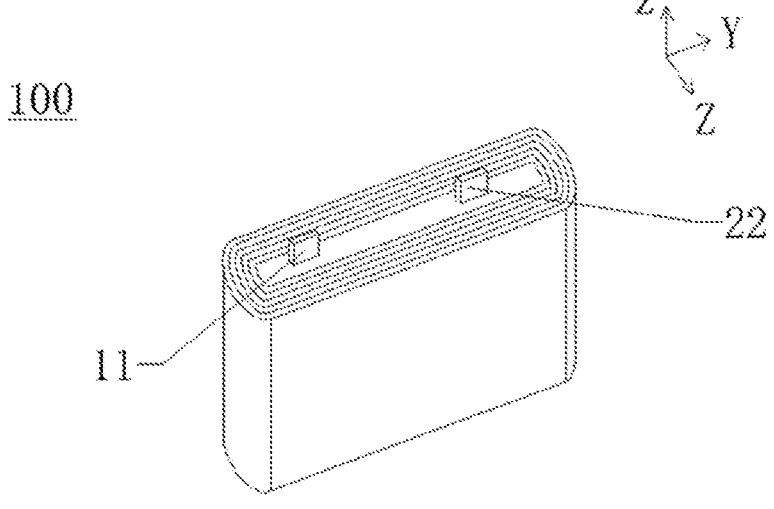
FIG. 2 is a schematic diagram of a wound electrode assembly according to an embodiment of the present application.
Figure 3:
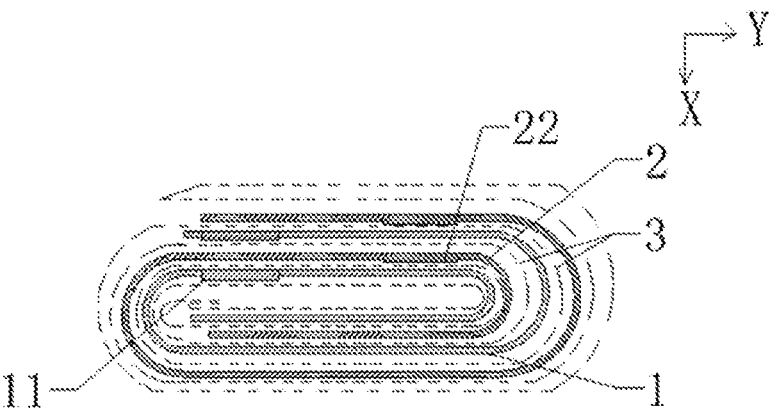
FIG. 3 is a cross-sectional view of the X-Y section of a wound electrode assembly according to an embodiment of the present application.

FIG. 1 is a schematic diagram of an apparatus for manufacturing an electrode assembly according to an embodiment of the present application. FIG. 2 illustrates an electrode assembly 100 formed by winding. As shown in FIG. 1, the electrode assembly manufacturing device includes a conveying device and a winding device (winding needle 5). The belt-shaped first electrode sheet 1, second electrode sheet 2, and separator 3 are conveyed to a winding device (winding needle 5) by a conveying device, and the first electrode sheet 1, the separator 3, the second electrode sheet 2, and the separator 3 are sequentially stacked and wound around the winding device (winding needle 5) and form the electrode assembly 100 (refer to FIG. 2). The winding needle 5 in FIG. 1 is merely illustrative, and the electrode assembly may be wound into an electrode assembly having a cylindrical cross section or an electrode assembly having an elliptical cross section (as shown in FIGS. 2 and 3) according to the type of a battery cell and the shape of a battery case.

Each circle (360°) the winding needle 5 rotates, the electrode assembly 100 increased by one layer. As shown in FIG. 2, the thickness of the electrode assembly 100 in the X direction increases gradually with the rotation of the winding needle 5. In addition, the width of the belt-shaped first electrode sheet 1, the second electrode sheet 2 and the separator 3 determines the height of the electrode assembly 100 in the Z-axis direction. FIG. 3 is a cross-sectional view in the X-Y plane of the electrode assembly 100 shown in FIG. 2. As shown in FIG. 3, for each winding layer, the separator 3, the second electrode sheet 2, the separator 3, and the first electrode sheet 1 are sequentially formed from outside to inside in the X direction. Thus, for each winding layer, the separator 3 separates the second electrode sheet 2 from the first electrode sheet 1.

Figure 4:
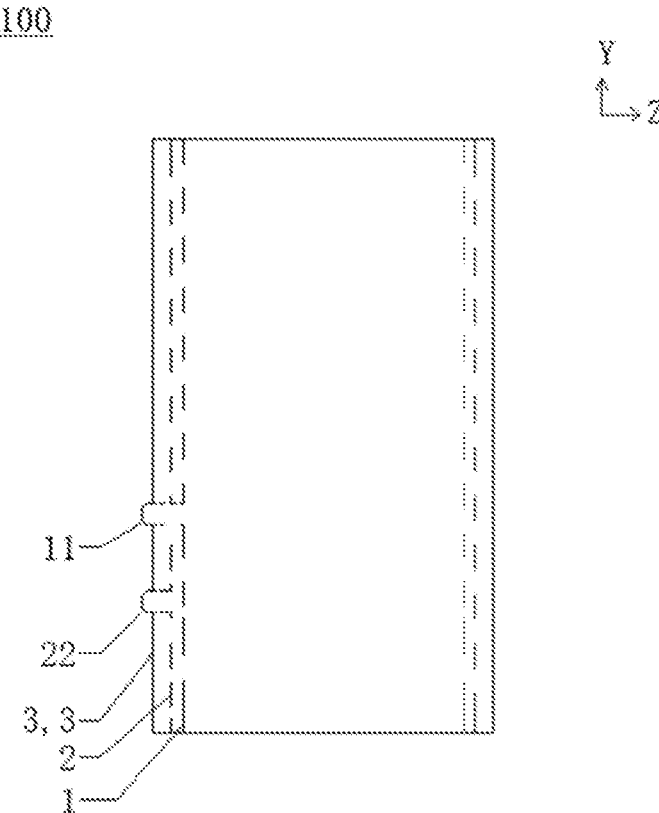
FIG. 4 is a schematic diagram of an expanded electrode assembly according to an embodiment of the present application.

An important parameter during the winding process of an electrode assembly is an alignment degree of the wound electrode assembly 100 in the Z-axis direction. Specifically, the alignment degree of the wound electrode assembly 100 in the Z-axis direction refers to the relative position between the second electrode sheet 2 and the first electrode sheet 1 in the Z-axis direction. FIG. 4 is an expended view of the stacked and wound electrode assembly 100 in the Y direction. As shown in this figure, in the Z-axis direction (i.e., the width direction of the expended electrode assembly 100), a separator 3, the second electrode sheet 2, another separator 3, and the first electrode sheet 1 should be arranged in sequence from outside to inside. That is, in the Z-axis direction, the separator 3 is located at the outermost side, the first electrode sheet 1 is located at the innermost side, and the second electrode sheet 2 exceeds the first electrode sheet 1 by a predetermined distance. In the winding process of the electrode assembly 100, the second electrode sheet 2 and the first electrode sheet 1 are prone to deflect, so that the relative position between the second electrode sheet 2 and the first electrode sheet 1 is deviated, thereby affecting the quality and performance of the manufactured battery cell. Therefore, in order to monitor the relative positional deviation between the second electrode sheet 2 and the first electrode sheet 1, the apparatus for manufacturing the electrode assembly further includes a photographing unit 4.

The ideal case is that the photographing unit photographs the wound electrode assembly 100, and identifies the second electrode sheet 2 and the first electrode sheet 1 in the obtained image, so as to determine the relative positional relationship between the second electrode sheet 2 and the first electrode sheet 1. However, as described above, for each winding layer of the electrode assembly, in order to photograph the first electrode sheet 1, it is necessary to penetrate the separator 3, the second electrode sheet 2 and the other separator 3 located between the second electrode sheet 2 and the first electrode sheet 1. Due to the limitations of the existing photographing unit, for example, the penetrating ability of the infrared photographing unit is very limited, and it is difficult to identify the second electrode sheet 2 and the first electrode sheet 1 simultaneously and determine the relative positional relationship thereof in the photographed image with the wound electrode assembly 100. Therefore, to determine positional deviation of the electrode sheets, it is necessary to use images with the first electrode sheet 1 and the second electrode sheet 2, which are respectively corresponding to the first image T1 and the second image T2.

In order to photograph the first electrode sheet 1, an image before winding is required (at this time, the second electrode sheet 2 and two layers of the separator 3 are not stacked on the first electrode sheet 1). In addition, as described above, positional deviation is prone to occur during the winding process. Therefore, to photograph the second electrode sheet 2, an image after winding is required. The first electrode sheet 1 in a first image T1 and the second electrode sheet 2 in a second image T2 that are obtained simultaneously do not have a corresponding relationship with each other. That is, the second electrode sheet 2 in a second image T2 enters the electrode assembly winding apparatus (winding needle 5) earlier than the first electrode sheet 1 in a first image T1 that are obtained simultaneously. Thus, there is a question of how to determine the relative positional deviation between the second electrode sheet 2 and the first electrode sheet 1 accurately by using a photographing unit 4.

Figure 5:
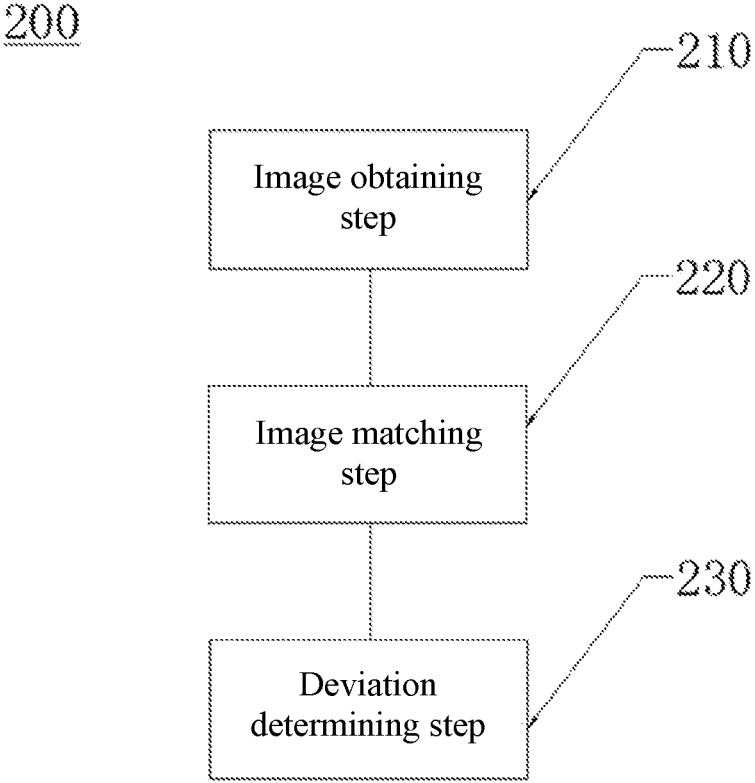
FIG. 5 is a flowchart of a deviation detection method according to an embodiment of the present application.

Based on the above consideration, after intensive research, the inventor proposes a deviation detection method. FIG. 5 is a flowchart of a deviation detection method according to an embodiment of the present application. As shown in FIG. 5, the deviation detection method 200 includes: an image obtaining step 210 of obtaining a plurality of first images T1 and a plurality of second images T2 by using a photographing unit 4 during the winding process of the electrode assembly 100, where the first image T1 includes a first electrode sheet 1, the second image T2 includes a second electrode sheet 2; an image matching step 220 of matching a first image T1 with a second image T2, the first image T1 and the second image T2 include the same or corresponding identification objects 6, the identification objects 6 are portions periodically formed on each winding layer of the electrode assembly 100; and a deviation determining step 230 of determining whether the electrode assembly 100 is deviated according to the boundary of the first electrode sheet 1 in the first image T1 and/or the boundary of the second electrode sheet 2 in the second image T2 in a group of matched first image T1 and second image T2.

In order to compare the relative position between the second electrode sheet 2 and the first electrode sheet 1 at the same position on the same winding layer of the wound electrode assembly 100 by using the first image T1 and the second image T2, identification objects are defined in the method according to an embodiment of the present application, and the identification objects are portions periodically formed on each winding layer of the electrode assembly 100. Thus, both of the first image T1 and the second image T2 photographed for each layer contain the identification objects.

By identifying the identification objects, a group of image T1 and image T2 in which the same or corresponding identification objects are photographed are matched. The deviation determining step 230 is performed by using a group of matched images T1 and T2. Thus, it is ensured that the first electrode sheet 1 and the second electrode sheet 2 in the same winding layer of the wound electrode assembly 100 are determined in the deviation determining step 230, so that the positional deviation of the electrode assembly 100 can be determined accurately.

Figure 6:
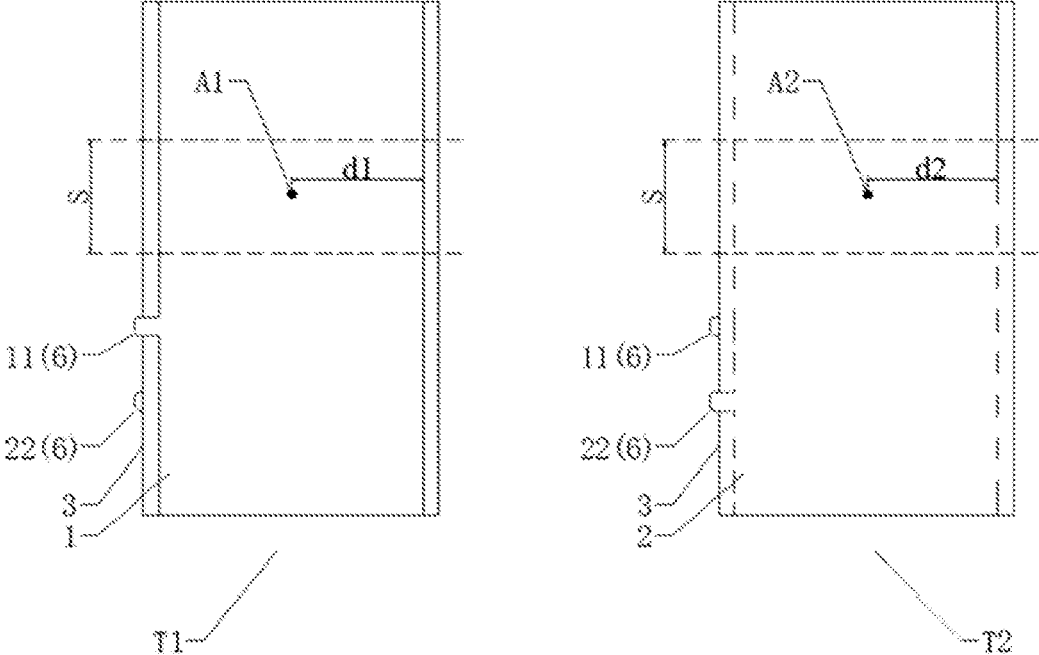
FIG. 6 is a schematic diagram of a group of matching first and second images according to an implementation of the present application.

According to some embodiments of the present application, as shown in FIG. 6, the identification objects 6 are a tab 11 of the first electrode sheet 1 and/or a tab 22 of the second electrode sheet 2 in the same winding layer. Since the tab 11 of the first electrode sheet 1 and/or the tab 22 of the second electrode sheet 2 are periodically formed on portions of each winding layer of the electrode assembly, there is no need to additionally provide an identifier on the electrode assembly 100, and a first image T1 and a second image T2 can be matched only through the tab 11 of the first electrode sheet and/or the tab 22 of the second electrode sheet. In addition, the identification objects 6 are not limited to the tab 11 of the first electrode sheet 1 and the tab 22 of the second electrode sheet 2, as long as which can appear in each of the first image T1 and the second image T2.

According to some embodiments of the present application, in the deviation determining step, comparison regions S are set according to the identification objects, and it is determined whether the electrode assembly 100 is deviated according to the boundary of the first electrode sheet 1 in a comparison region S in a first image T1 and/or the boundary of the second electrode sheet 2 in a comparison region S in a second image T2.

As shown in FIG. 6, in the Y direction, the distance between the comparison region S in a first image T1 and an identification object 6 is equal to the distance between the comparison region S in a second image T2 and the same or corresponding identification object 6. Thus, as long as the identification object 6 in the first image T1 and the identification object 6 in the second image T2 being corresponding to each other can be ensured, it is ensured that the comparison region S in the first image T1 and the comparison region S in the second image T2 are the same region where the first electrode sheet 1 and the second electrode sheet 2 are stacked with each other in the same winding layer. Thus, it is possible to determine positional deviation of the electrode assembly during a winding process more accurately. Further, the comparison region S is a region with a predetermined length in the Y direction. The predetermined length is less than the expended length of a winding layer. By determining the relative positional deviation between the first electrode sheet 1 and the second electrode sheet 2 based on the predetermined length, rather than determining the positional deviation based on the entire expended length, the deviation determination speed can be increased.

According to some embodiments of the present application, the first image T1 is an image before the electrode assembly 100 is wound around the winding needle 5, and the second image T2 is an image after the electrode assembly 100 is wound around the winding needle 5.

As shown in FIG. 6, in a first image T1 with the electrode assembly 100 before wound photographed, the first electrode sheet 1 is located at the outermost side in the X-axis direction, and a separator 3, the second electrode sheet 2, and another separator 3 are arranged under the first electrode sheet 1 in sequence. Depending on the penetrating ability of the photographing unit 4, the first electrode sheet 1 and a separator 3 can be identified in the first image T1. In the second image T2 with the wound electrode assembly 100, the separator 3 is located at the outermost side in the X-axis direction, and the second electrode sheet 2, another separator

3, and the first electrode sheet 1 are arranged under the separator 3 in sequence. Depending on the penetrating ability of the photographing unit 4, the separator 3 and the second electrode sheet 2 can be identified in the second image T2. Further, the first electrode sheet 1 in the first image T1 is in a state before the winding process of the electrode assembly 100, and the second electrode sheet 2 in the second image T2 is in a state after the winding process of electrode assembly 100.

The electrode assembly 100 is prone to deviate during winding around the winding needle. By comparing the second image T2 in which the electrode assembly 100 after the winding process is photographed with the first image T1 in which the state of the electrode assembly 100 before the winding process is photographed, it can be determined whether the first electrode sheet 1 and the second electrode sheet 2 are deviated during the winding process.

According to some embodiments of the present application, in the image obtaining step 210, a first image T1 and a second image T2 are obtained when the winding needle 5 rotates for a preset angle α.

Referring to FIG. 1, a first image T1 with the first electrode sheet 1 and a second image T2 with the second electrode sheet 2 are output at each rotation of the winding needle 5 by a preset angle α (for example, α=360°). The angle α is not limited to 360°, as long as it is ensured that each of the output first image T1 and the second image T2 contains only one same or corresponding identification object 6. Further, since the image is obtained during rotation, the deviation determination may be performed in real time.

According to some embodiments of the present application, referring to FIG. 1, the photographing unit 4 includes a first camera 41 and a second camera 42. The first camera 41 photographs the first image T1, the second camera 42 photographs the second image T2, the first camera 41 and the second camera 42 photograph two opposite faces of the electrode assembly 100 respectively.

The first camera 41 and the second camera 42 of the photographing unit 4 may be line-scan cameras, and the second image T2 output by the second camera 42 is equivalent to an expanded view of the wound electrode assembly 100 in the Y direction.

The electrode assembly 100 is prone to deviate during winding around the winding needle. By comparing the first image T1 and the second image T2 of two opposite faces of the electrode assembly 100, it can be determined whether the first electrode sheet 1 and the second electrode sheet 2 are deviated during the winding process.

According to some embodiments of the present application, in the image matching step 220, the (n+1)th second image T2 and the n-th first image T1 obtained in the image obtaining step 210 are matched.

As described above, a first image T1 and a second image T2 are output at each rotation of the winding needle 5 by a preset angle α (for example, α=360°), and the output first image T1 and the second image T2 are counted. By setting the preset angle α to be less than or equal to 360°, it is ensured that each of the second image T2 and the first image T1 has one and only one identification object 6. In addition, referring to FIG. 1, the electrode assembly 100 in the output second image T2 is wound around the winding needle 5 earlier than the electrode assembly 100 in the first image T1. Furthermore, there is no identification object 6 in the first photo of the second image T2. Therefore, the electrode assemblies 100 in the (n+1)th second image T2 and the n-th first image T1 are from the same winding layer. In addition, it should be understood that the matching principle of the first image T1 and the second image T2 depends on the position of the first camera 41 and the second camera 42 in the photographing unit 4. For example, when the first camera 41 is far away from the second camera 42, it is also possible that the (n+2) th second image T2 matches with the n-th first image T1.

According to some embodiments of the present application, in the deviation determining step 230, as shown in FIG. 6, in a group of matched first image T1 and second image T2, a first distance d1 is obtained from the first image T1, a second distance d2 is obtained from the second image T2, the first distance d1 is a distance from a first reference point A1 to the boundary of the first electrode sheet 1, and the second distance is a distance from a second reference point A2 to the boundary of the second electrode sheet 2, and when the difference between the first distance d1 and the second distance d2 minus a preset distance between the boundary of the first electrode sheet 1 and the boundary of the second electrode sheet 2 is greater than a first threshold, it is determined that the electrode assembly 100 is deviated.

There is no restriction on the selection of the first reference point A1 and the second reference point A2, as long as there is a fixed corresponding relationship between the first distance d1 determined by the first reference point A1 and the second distance d2 determined by the second reference point A2. Thus, by comparing the first distance d1 and the second distance d2, it is possible to determine the relative positional relationship between the first electrode sheet 1 and the second electrode sheet 2, so as to determine whether the electrode assembly 100 has a positional deviation during a winding process.

According to some embodiments of the present application, in the deviation determining step 230, in a group of matched first image T1 and second image T2, a first distance d1 is obtained from the first image T1, a second distance d2 is obtained from the second image T2, the first distance d1 is a distance from a first reference point A1 to the boundary of the first electrode sheet 1, the second distance d2 is a distance from a second reference point A2 to the boundary of the second electrode sheet 2, it is determined whether the first electrode sheet 1 of the electrode assembly 100 is deviated by comparing the first distance d1 with a preset value of the first distance d1_ref, and it is determined whether the second electrode sheet 2 of the electrode assembly 100 is deviated by comparing the second distance d2 with a preset value of the second distance d2_ref.

By comparing the first distance d1 and the second distance d2 with preset values thereof, it can be respectively determined whether the first electrode sheet 1 and the second electrode sheet 2 have positional deviation, and when it is determined that positional deviation occurs, compared with determining the relationship between the first distance d1 and the second distance d2, which electrode sheet has a positional deviation can be determined more precisely.

Alternatively, the relationship between the first distance d1 and the second distance d2 can be determined first, so as to determine whether there is positional deviation of the electrode assembly 100 during a winding process. When it is determined that there is positional deviation of the electrode assembly 100 during a winding process, the comparison between the first distance d1 and the preset value of the first distance d1_ref and the comparison between the second distance d2 and the preset value of the second distance d2_ref are performed, so as to know which electrode sheet has a positional deviation more accurately. When it is determined that there is no positional deviation of the electrode assembly 100 during a winding process, it is not necessary to perform the next step of deviation determination, thereby improving the efficiency of deviation determination.

According to some embodiments of the present application, a deviation detection device is provided, wherein the device is configured to detect positional deviation of an electrode assembly 100 during a winding process, the electrode assembly 100 includes a first electrode sheet 1 and a second electrode sheet 2, the deviation detection device includes: an image obtaining unit, configured to obtain a plurality of first images T1 and a plurality of second images T2 during the winding process of the electrode assembly 100, where the first image T1 includes the first electrode sheet 1, the second image T2 includes the second electrode sheet 2; an image matching unit, configured to match a first image T1 with a second image T2, the first image T1 and the second image T2 include the same or corresponding identification objects 6, the identification objects 6 are portions periodically formed on each winding layer of the electrode assembly 100; and a deviation determining unit, configured to determine, aims at a group of matched first image T1 and second image T2, whether the electrode assembly 100 is deviated according to the boundary of the first electrode sheet in the first image and/or the boundary of the second electrode sheet in the second image. By means of the deviation detection device, the relative positional relationship between the first electrode sheet 1 and the second electrode sheet 2 at the same position on the same winding layer can be determined, so that whether there is positional deviation of the electrode assembly 100 during a winding process can be determined more accurately.

According to some embodiments of the present application, referring to FIG. 1 to FIG. 6, the present application provides a deviation detection method 200, including the following steps:

an image obtaining step 210 of obtaining a first image T1 and a second image T2 by using a photographing unit 4 at each rotation of the winding needle 5 by a preset angle $\alpha$ during the winding process of the electrode assembly 100, where the first image T1 includes the first electrode sheet 1 before wound, the second image T2 includes the second electrode sheet 2 after wound;

an image matching step 220 of matching the (n+1)th second image T2 with the n-th first image T1, thereby ensuring that the second electrode sheet 2 in the (n+1)th second image T2 is in the same winding layer of the electrode assembly 100 with the first electrode sheet 1 in the n-th first image T1, and the first image T1 and the second image T2 contain the same or corresponding identification object 6 (a first tab 11 and/or a second tab 22); and a deviation determining step 230, firstly, identifying the identification object 6 in a group of matched first image T1 and second image T2, and determining comparison regions S according to the identification object 6, thereby determining that a comparison region S of the first electrode sheet 1 and a comparison region S of the second electrode sheet 2 subject to the deviation determination are from the same region of the same winding layer of the electrode assembly 100; then, defining a first reference point A1 and a second reference point A2 in the comparison regions, thereby obtaining a first distance d1 (a distance between the first reference point A1 and the boundary of the first electrode sheet 1) and a second distance d2 (a distance between the second reference point A2 and the boundary of the second electrode sheet 2), and determining whether the electrode assembly 100 is deviated by comparing the difference between the distances d1 and d2 with a first threshold. When it is determined that the electrode assembly 100 is deviated, further comparing d1 with a preset value of the first distance d1_ref and comparing d2 with a preset value of the second distance d2_ref, so as to determine which one of the first electrode sheet 1 and the second electrode sheet 2 is deviated more accurately.

Finally, it should be noted that the present application is not limited to the to the above embodiments. The above embodiments are merely examples, and the embodiments having substantially the same composition as the technical idea within the technical solutions of the present application and exhibiting the same effect are all included within the technical scope of the present application. In addition, other ways that can be constructed by applying various modifications that can be conceived by a person skilled in the art to the embodiments without departing from the subject matter of the present application, and combining some of the constituent elements in the embodiments are also included in the scope of the present application.

The invention claimed is:

1. A deviation detection method for detecting positional deviation of an electrode assembly during a winding process of the electrode assembly, the electrode assembly comprising a first electrode sheet and a second electrode sheet, wherein the deviation detection method comprises:

an image obtaining step of obtaining a plurality of first images and a plurality of second images by a photographing unit during the winding process of the electrode assembly, the plurality of the first images comprising the first electrode sheet, and the plurality of the second images comprising the second electrode sheet, an image matching step of matching a first image from the plurality of first images with a second image from the plurality of second images, the first image and the second image containing the same or corresponding identification objects, the identification objects being portions periodically formed on each winding layer of the electrode assembly, and a deviation determining step of determining whether the electrode assembly is deviated in a pair of the matching first and second images according to a boundary of the first electrode sheet in the matching first image and/or a boundary of the second electrode sheet in the matching second image, wherein the identification objects are a tab of the first electrode sheet and/or a tab of the second electrode sheet in the same winding layer.

2. The method according to claim 1, wherein in the deviation determining step, comparison regions are set according to the identification objects, and it is determined whether the electrode assembly is deviated according to the boundary of the first electrode sheet in the comparison region of the first image and/or the boundary of the second electrode sheet in the comparison region of the second image.

3. The method according to claim 1, wherein the plurality of first images are images of the electrode assembly before being wound around a winding needle, and the plurality of second images are images of the electrode assembly after being wound around the winding needle.

4. The method according to claim 3, wherein in the image obtaining step, the plurality of first images and the plurality of second images are obtained when the winding needle rotates for a preset angle.

5. The method according to claim 1, wherein, in the image obtaining step, the photographing unit comprises a first camera and a second camera, the first camera photographs the plurality of first images, and the second camera photographs the plurality of second images, and the first camera and the second camera photograph two opposite faces of the electrode assembly, respectively.

6. The method according to claim 1, wherein in the imaging matching step, a (n+1)th second images of the plurality of second images and a n-th first images of the plurality of firsts images that are obtained in the image obtaining step are matched.

7. The method according to claim 1, wherein in the deviation determining step, in a pair of the matching first and second images, a first distance is obtained from the first image, a second distance is obtained from the second image, the first distance is a distance from a first reference point to the boundary of the first electrode sheet, and the second distance is a distance from a second reference point to the boundary of the second electrode sheet, and when the difference between the first distance and the second distance minus a preset distance between the boundary of the first electrode sheet and the boundary of the second electrode sheet is greater than a first threshold, it is determined that the electrode assembly is deviated.

8. The method according to claim 1, wherein in the deviation determining step, in a pair of the matching first and second images, a first distance is obtained from the first image, a second distance is obtained from the second image, the first distance is a distance from a first reference point to the boundary of the first electrode sheet, and the second distance is a distance from a second reference point to the boundary of the second electrode sheet, it is determined whether the first electrode sheet of the electrode assembly is deviated by comparing the first distance with a preset value of the first distance, and it is determined whether the second electrode sheet of the electrode assembly is deviated by comparing the second distance with a preset value of the second distance.

\* \* \* \* \*